United States Patent
Pozzi

(10) Patent No.: US 12,528,587 B2
(45) Date of Patent: Jan. 20, 2026

(54) UNDER SEAT BAGGAGE STOWAGE IN A VEHICLE INTERIOR

(71) Applicant: SUPERNAL, LLC, Washington, DC (US)

(72) Inventor: Alexander Pozzi, Carlsbad, CA (US)

(73) Assignee: SUPERNAL, LLC, Irvine, CA (US)

( * ) Notice: Subject to any disclaimer, the term of this patent is extended or adjusted under 35 U.S.C. 154(b) by 0 days.

(21) Appl. No.: 18/825,933

(22) Filed: Sep. 5, 2024

(65) Prior Publication Data

US 2025/0083820 A1    Mar. 13, 2025

Related U.S. Application Data

(60) Provisional application No. 63/537,022, filed on Sep. 7, 2023.

(51) Int. Cl.
*B64D 11/06* (2006.01)
*B60R 7/04* (2006.01)

(52) U.S. Cl.
CPC .......... *B64D 11/0636* (2014.12); *B60R 7/043* (2013.01)

(58) Field of Classification Search
CPC .. B64D 11/0627; B64D 11/0636; B60R 7/043
See application file for complete search history.

(56) References Cited

U.S. PATENT DOCUMENTS

| | | | | |
|---|---|---|---|---|
| 7,322,629 | B2 * | 1/2008 | McClintock | B60N 2/3075 296/37.14 |
| 7,377,467 | B2 * | 5/2008 | Saint-Jalmes | B64D 11/06 244/118.6 |
| 7,730,586 | B2 * | 6/2010 | McDonald | B60R 7/04 16/326 |
| 7,914,074 | B2 * | 3/2011 | Lindsay | B60R 7/043 297/188.13 |
| 9,481,310 | B2 * | 11/2016 | Chawlk | B60R 7/043 |
| 9,873,383 | B1 * | 1/2018 | Mather | B60R 7/043 |
| 10,370,109 | B2 * | 8/2019 | Fortin | B60N 2/1615 |
| 10,525,892 | B2 * | 1/2020 | Gargano | E05G 1/005 |
| 10,773,654 | B2 * | 9/2020 | Adrain | B60R 7/14 |
| 11,142,105 | B2 * | 10/2021 | Cha | B60N 2/015 |
| 11,161,614 | B2 * | 11/2021 | Schuttera | B64D 11/0636 |

(Continued)

FOREIGN PATENT DOCUMENTS

| | | | | |
|---|---|---|---|---|
| DE | 4106506 A1 * | 9/1992 | | B62D 43/10 |
| EP | 1302366 A1 * | 4/2003 | | B60R 7/043 |

(Continued)

*Primary Examiner* — Joseph W Sanderson
(74) *Attorney, Agent, or Firm* — MCDONNELL BOEHNEN HULBERT & BERGHOFF LLP

(57) ABSTRACT

A vehicle interior having a base frame comprising a plurality of rails and a floor mounted on the base frame. The vehicle interior also includes at least one seat including a frame having a substantially vertical component and a substantially horizontal component. The substantially horizontal component is mounted to the floor and the substantially vertical component extends upwards from one end of the substantially horizontal component. The at least one seat also includes a chair coupled to the frame. The vehicle interior also includes at least one storage compartment positioned within the floor under the at least one seat and positioned between two of the plurality of rails.

17 Claims, 12 Drawing Sheets

(56) References Cited

U.S. PATENT DOCUMENTS

| | | | |
|---|---|---|---|
| 11,325,537 B2* | 5/2022 | Hernandez Soto | B60R 7/043 |
| 11,608,003 B2* | 3/2023 | Kuttumukkula Chandrasekaran | B60N 2/305 |
| 11,738,690 B2* | 8/2023 | Pawlowski | B60R 7/043 224/542 |
| 11,767,120 B2* | 9/2023 | Constantin | B64D 11/0601 244/118.6 |
| 2003/0222174 A1* | 12/2003 | Saint-Jalmes | B60R 7/043 244/118.1 |
| 2007/0024077 A1* | 2/2007 | McClintock | B60R 7/02 296/37.14 |
| 2008/0178428 A1* | 7/2008 | McDonald | B60R 7/04 16/344 |
| 2010/0231011 A1* | 9/2010 | Lindsay | B60R 7/043 297/188.11 |
| 2016/0200258 A1* | 7/2016 | Chawlk | B60R 7/043 296/37.14 |
| 2019/0039736 A1* | 2/2019 | Fortin | B64D 11/0641 |
| 2019/0152401 A1* | 5/2019 | Gargano | B60R 7/04 |
| 2019/0210538 A1* | 7/2019 | Adrain | B60R 7/14 |
| 2019/0389583 A1* | 12/2019 | Constantin | B64D 11/003 |
| 2020/0108935 A1* | 4/2020 | Schuttera | B64D 11/0648 |
| 2020/0376988 A1* | 12/2020 | Cha | B60N 2/015 |
| 2022/0073005 A1* | 3/2022 | Hernandez Soto | B60R 7/043 |
| 2022/0242324 A1* | 8/2022 | Kuttumukkula Chandrasekaran | B60N 2/305 |
| 2022/0340085 A1* | 10/2022 | Li | B60R 7/043 |
| 2022/0402436 A1* | 12/2022 | Pawlowski | B60R 7/043 |
| 2025/0018870 A1* | 1/2025 | Harmon | B60R 7/043 |

FOREIGN PATENT DOCUMENTS

| | | | | |
|---|---|---|---|---|
| FR | 3036360 A1 | * | 11/2016 | B60R 7/043 |
| JP | 3433064 B2 | * | 8/2003 | B62D 43/10 |
| KR | 20220138939 A | * | 10/2022 | B60N 2/0722 |
| KR | 20230013781 A | * | 1/2023 | B60N 3/002 |

* cited by examiner

UNDER SEAT BAGGAGE STOWAGE IN A VEHICLE INTERIOR

CROSS-REFERENCE TO RELATED APPLICATIONS

The present application claims priority to provisional U.S. Application No. 63/537,022 filed Sep. 7, 2023, the contents of which are hereby incorporated by reference in its entirety.

BACKGROUND

A vehicle, such as a vertical takeoff and landing (VTOL) aircraft, a helicopter, a drone, a fixed-wing aircraft, or the like can be used to facilitate transportation of passengers and/or cargo. A person of ordinary skill in the art will recognize that some passengers prefer to keep their larger personal items-such as larger purses, backpacks, diaper bags, and briefcases—with them while they travel so that they have easy access to items they may need during travel and/or to keep an eye on valuables during travel. However, when there is limited space within a vehicle, it can be difficult to provide stowage for these larger personal items without making the vehicle larger/heavier, losing a seat placement, or building an in-cabin stowage cabinet specifically for this purpose.

Accordingly, the present application seeks to solve this problem by taking advantage of already-existing infrastructure in the cabin of a vehicle that was previously unused. Most of the space under the passenger and pilot seats in the cabin of a VTOL has traditionally been unusable because that area must remain clear to allow the seat structure to stroke down during a hard landing or crash. To ensure this area remains clear, it has been typically blocked off or placarded to make sure passengers don't use this space for their personal belongings, thus inhibiting the safety mechanism built-in to the infrastructure. However, by including a storage compartment positioned within the floor under a seat within the cabin and between a plurality of rails that make up the base frame of the VTOL, a passenger may be able to stow a larger personal item in the storage compartment without interfering with the requisite safety clearance required for the VTOL seat to properly stroke.

SUMMARY

Embodiments described herein relate to methods and systems of the stowage of baggage (large purse, backpack, briefcase, etc.) under a passenger's seat in a vehicle, specifically within at least a portion of a floor structure of the interior of the vehicle.

An example embodiment includes a vehicle interior having a base frame comprising a plurality of rails and a floor mounted on the base frame. The vehicle interior also includes at least one seat including a frame having a substantially vertical component and a substantially horizontal component. The substantially horizontal component is mounted to the floor and the substantially vertical component extends upwards from one end of the substantially horizontal component. The at least one seat also includes a chair coupled to the frame. The vehicle interior also includes at least one storage compartment positioned within the floor under the at least one seat and positioned between two of the plurality of rails.

In some embodiments, an aircraft system is disclosed, the system including a body including a vehicle interior. The vehicle interior has a base frame comprising a plurality of rails and a floor mounted on the base frame. The vehicle interior also includes at least one seat including a frame having a substantially vertical component and a substantially horizontal component. The substantially horizontal component is mounted to the floor and the substantially vertical component extends upwards from one end of the substantially horizontal component. The at least one seat also includes a chair coupled to the frame. The vehicle interior also includes at least one storage compartment positioned within the floor under the at least one seat and positioned between two of the plurality of rails. The aircraft system also includes at least one wing extending from the body of the craft, a plurality of rotors, and a tail.

In another example embodiment, a vehicle floor is disclosed having a base frame comprising a plurality of rails positioned on a bottom surface of the vehicle floor. The vehicle floor also includes at least one storage compartment positioned within the vehicle floor. The vehicle floor further includes at least one seat mounted on a top surface of the vehicle floor. The at least one storage compartment is positioned under the at least one seat.

These as well as other aspects, advantages, and alternatives will become apparent to those of ordinary skill in the art by reading the following detailed description, with reference, where appropriate, to the accompanying drawings.

DETAILED DESCRIPTION

Disclosed herein are examples of an under seat baggage stowage system for an aircraft (e.g., an eVTOL aircraft), which may utilized to economize space and weight while still providing adequate stowage locations for passengers to utilize during travel. As a person of ordinary skill in the art will recognize, by including a storage compartment positioned within the floor under a seat within the cabin and between a plurality of rails that make up the base frame of the VTOL, a passenger may be able to stow a larger personal item in the storage compartment without interfering with the requisite safety clearance required for the VTOL seat to properly stroke. It is contemplated that the present invention may be utilized in a variety of ways, using different shapes, features, and components to create stowage within a cabin of the VTOL without interfering with other necessary parts of the craft. By utilizing this structure, the usable space available to passengers to conveniently store personal items within the VTOL is increased, craft turn times are improved since passengers do not have to exit the vehicle to pick up their belongings in an alternative cargo hold, and the chance of loss or theft of passenger personal items is reduced because the personal belongings remain with the passengers during the entire flight.

In some embodiments, and as noted above, the vehicle may be a VTOL, which may or may not have limited interior space in which to stow personal items. It should be understood that in other embodiments, the vehicle may be any other type of vehicle that may be able to utilize the advantages of the present invention, such as a ground vehicle (i.e., an automobile), a sea vehicle (such as a boat), or a flying craft (such as an aerial, floating, soaring, hovering, airborne, aeronautical aircraft, airplane, plane, spacecraft, a helicopter, an airship, or an unmanned aerial vehicle, or a drone).

Figure 1A:
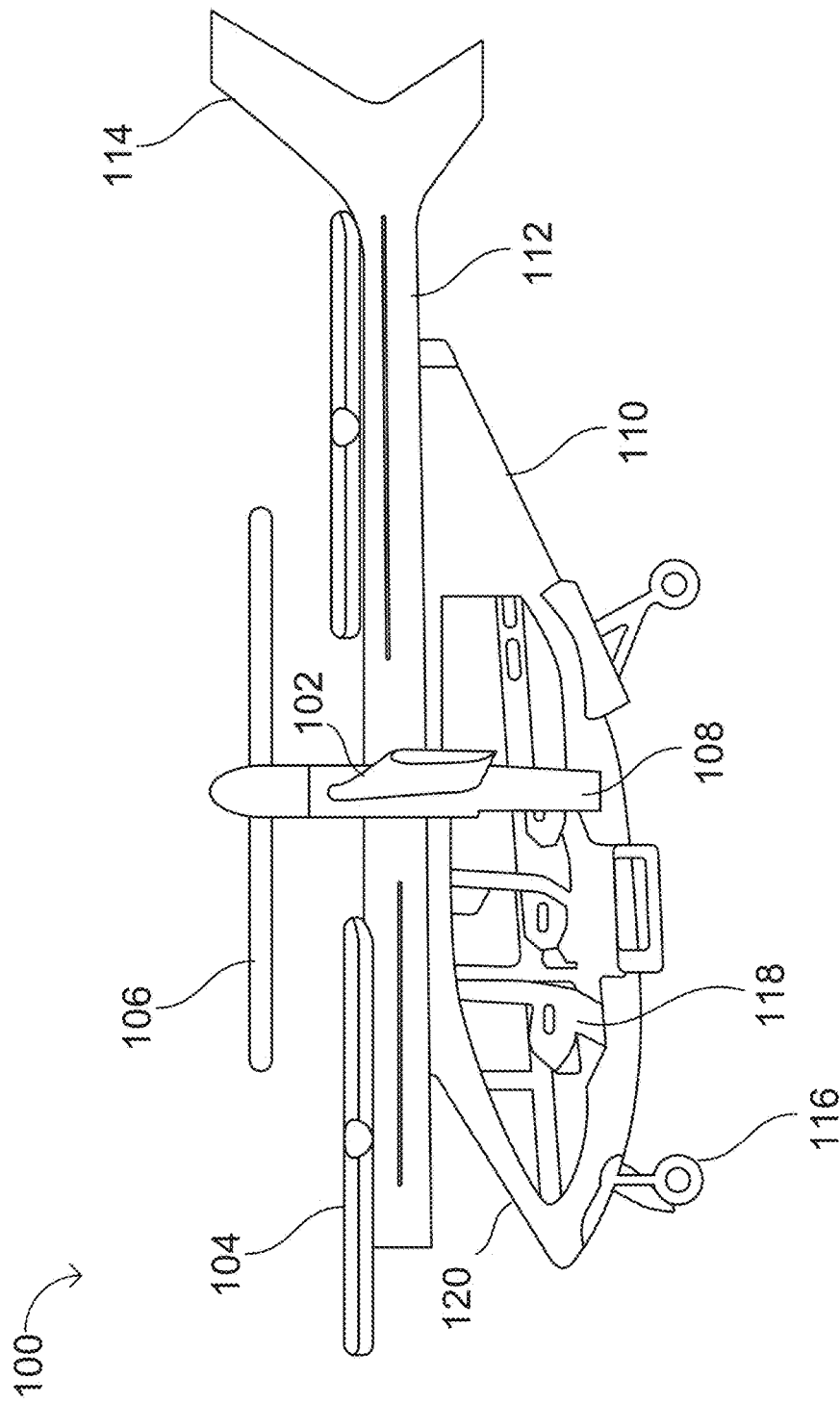
FIG. 1A depicts an aircraft configuration, according to exemplary embodiments of the present invention.

FIG. 1A illustrates a craft 100 in a vertical take-off and landing configuration according to an example embodiment of the present invention. As shown in FIG. 1A, the craft 100 may include, among other things, one or more lift surfaces 102, one or more lift propellers 104, one or more tilting propellers 106 which may be mounted on respective hubs 108, a body 110, one or more booms 112, and a tail 114. The body 110 may include gear 116 for landing on land and/or water, which may or may not be retractable. The body 110 may also include a cockpit, such as cabin 118, configured to hold a pilot, passenger(s), and/or cargo. The body 110 may also include a windshield 120 of any suitable shape and size; one or more doors configured to open and/or close (e.g., by swinging, sliding, and/or raising/lowering) to allow ingress/egress of persons and/or cargo; one or more seats; and controls and/or a computer system configured to communicate and/or control craft systems for the craft. The craft 100 may be manned or unmanned. It is envisioned that craft 100 may be used for any purpose known to those skilled in the art, including for example, as a taxi, a delivery vehicle, a personal vehicle, a cargo transport, a short or long-distance hauling aircraft, and/or a video/photography craft.

Figure 1B:
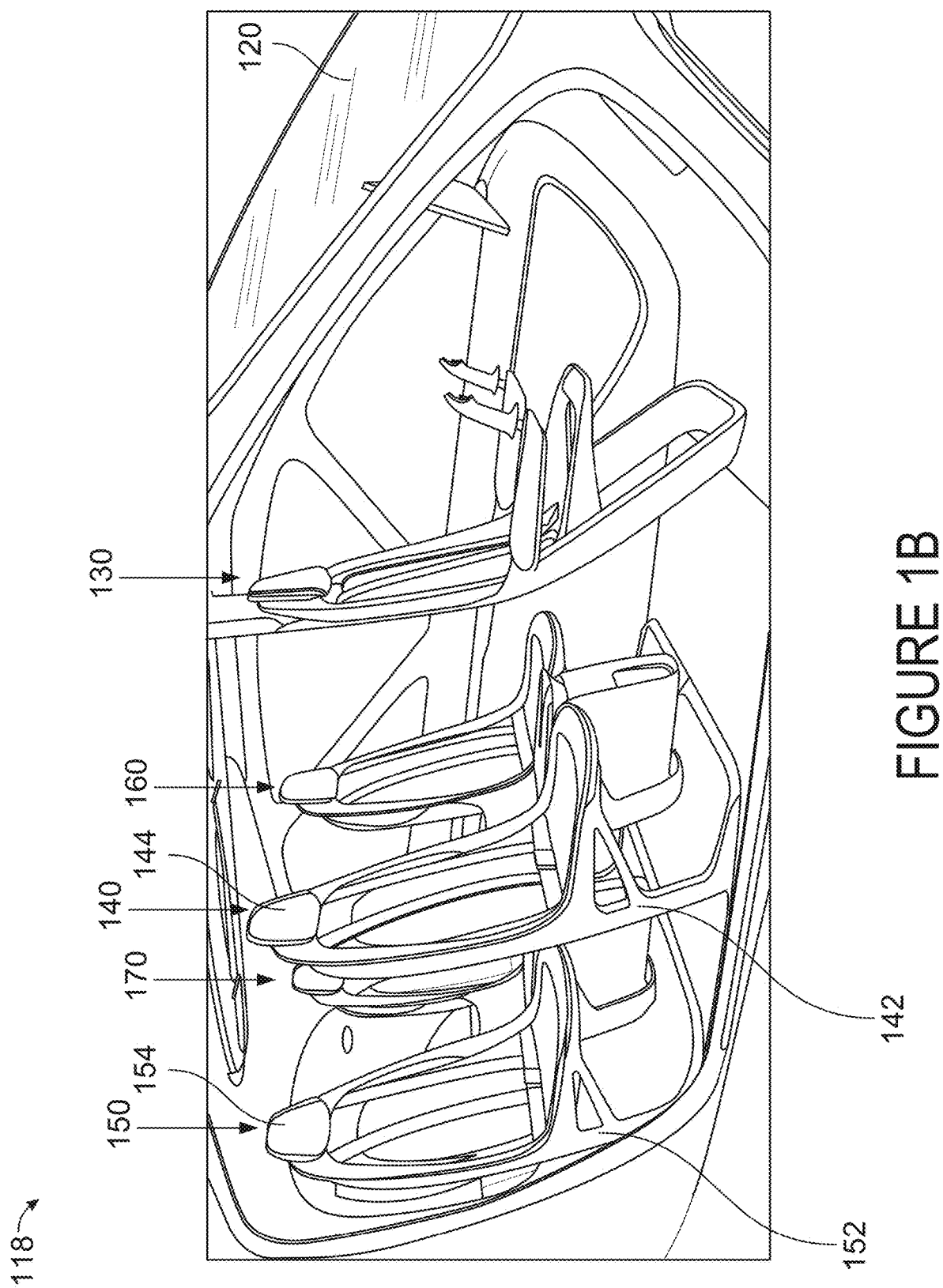
FIG. 1B depicts an exemplary cabin within the aircraft of FIG. 1A, according to an exemplary embodiment of the present invention.

FIG. 1B illustrates an interior of the cabin 118 of craft 100 according to an example embodiment of the present invention. In some embodiments, the cabin 118 may include a captain or pilot seat 130, a first seat 140, a second seat 150, a third seat 160, and a fourth seat 170. Other arrangements and numbers of seats within the cabin 118 are also possible. In some embodiments, the captain seat 130, the first seat 140, the second seat 150, the third seat 160, and the fourth seat 170 each include a frame and a chair component coupled with the frame. For instance, the first seat 140 may include a frame 142 and a chair component 144 coupled with the frame 142. Similarly, the second seat 150 may include a second frame 152 and a second chair component 154 coupled with the second frame 152. It should be understood that in other embodiments, the seats may be configured in any known manner.

Figure 2A:
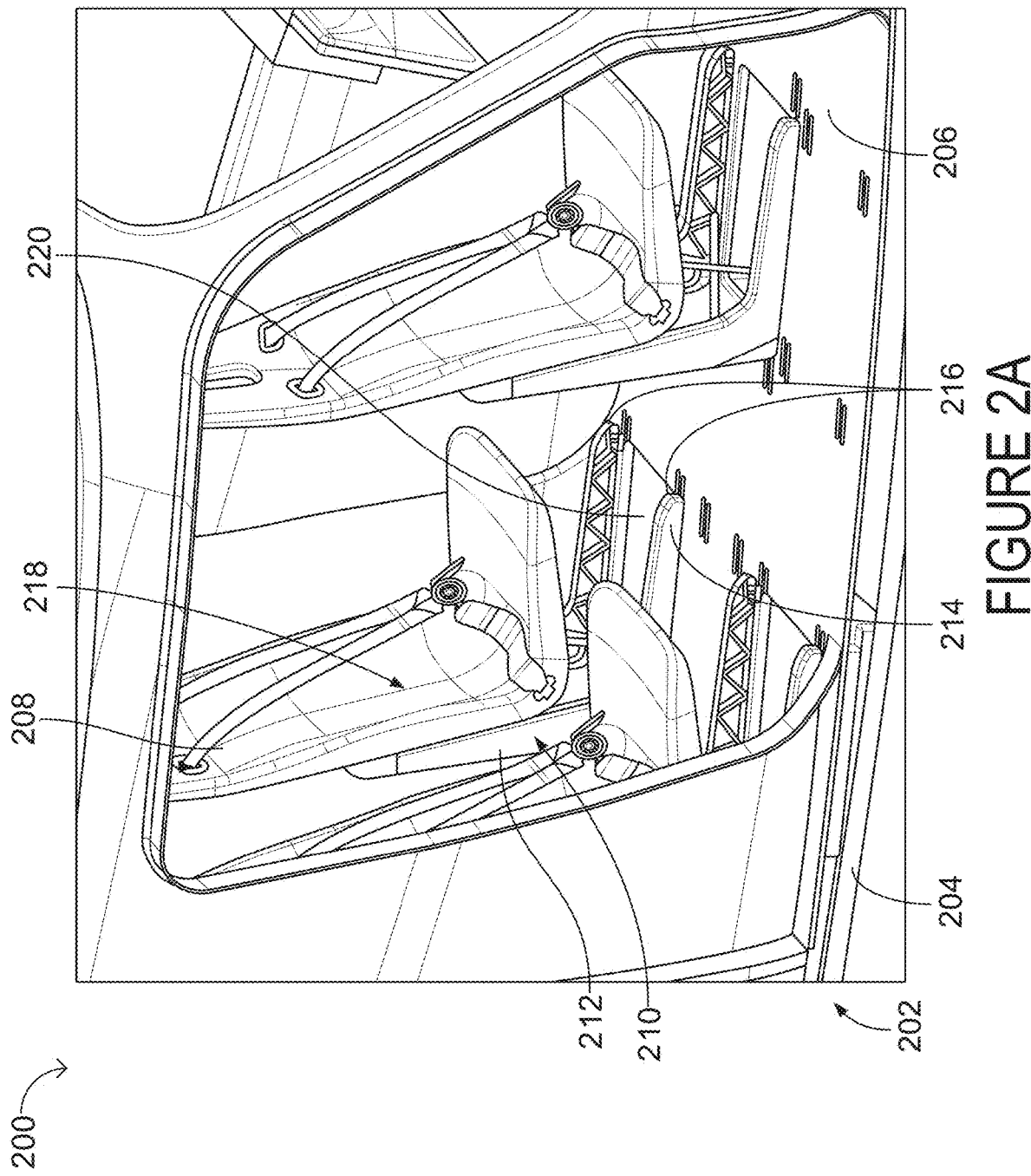
FIG. 2A depicts under seat baggage stowage compartment in the interior of a vehicle, according to an exemplary embodiment of the present invention.

FIGS. 2A-2E show aspects of a vehicle interior 200, which may include aspects of the body 110 and the cabin 118 of craft 100. Any other component of craft 100 may also be included surrounding the vehicle interior 200. For example, FIG. 2A depicts under seat baggage stowage compartment in the vehicle interior 200, according to an exemplary embodiment of the present invention. Other configurations of the vehicle interior 200 are also possible, such as the one described in FIG. 1B.

In some embodiments, the vehicle interior 200 has a base frame 202. The base frame 202 includes a plurality of rails 204 extending lengthwise along the frame 202, that make up at least a portion of the rigid structure of the vehicle. A floor 206 may be mounted onto the base frame 202. In some embodiments, the floor 206 is mounted to the base frame 202 at a set distance above the plurality of rails 204. In other embodiments, the floor 206 is in direct contact with the plurality of rails 204. The floor 206 may be made of various materials and may be of varying thicknesses.

The vehicle interior 200 also includes at least one seat 208. In some embodiments, the vehicle interior 200 includes a plurality of seats, such as the at least one seat 208, in a variety of arrangements and/or configurations. For instance, in FIG. 2A, a captain's seat is shown with a first passenger seat and a second passenger seat aft of the captain's seat. Each of the captain's seat, the first passenger seat, and the second passenger seat may include the same components as the at least one seat 208. Other interior arrangements and numbers of seats inside of the vehicle are also possible.

The at least one seat 208 includes a frame 210 having a substantially vertical component 212 and a substantially horizontal component 214. The substantially horizontal component 214 of the frame 210 may be mounted to the floor 206 at a plurality of attachment points 216. In some embodiments, the plurality of attachment points 216 include a first attachment point near a front end of the substantially horizontal component 214 of the frame 210 and a second attachment point near an aft end of the substantially horizontal component 214 of the frame 210. Further, the substantially vertical component 212 of the frame 210 may extend upwards from an end of the substantially horizontal component 214 of the frame 210, such as an aft end of the substantially horizontal component 214. In some embodiments, the substantially vertical component 212 of the frame 210 and the substantially horizontal component 214 of the frame 210 are manufactured integrally to each other. In other embodiments, the substantially vertical component 212 of the frame 210 and the substantially horizontal component 214 of the frame 210 are independently-manufactured pieces that are coupled together through a mounting mechanism. In some embodiments, a chair 218 is coupled with the frame 210. Further, in some embodiments, the chair 218 is a bucket-shaped structure configured to seat a passenger.

The vehicle interior 200 further includes an at least one storage compartment 220. The at least one storage compartment 220 may be configured as a recess positioned within the floor 206 under the at least one seat 208. Further, the at least one storage compartment 220 may be positioned between two of the plurality of rails 204. The at least one storage compartment 220 may include a variety of features and be of a plethora of shapes and sizes, as described below.

Figure 2B:
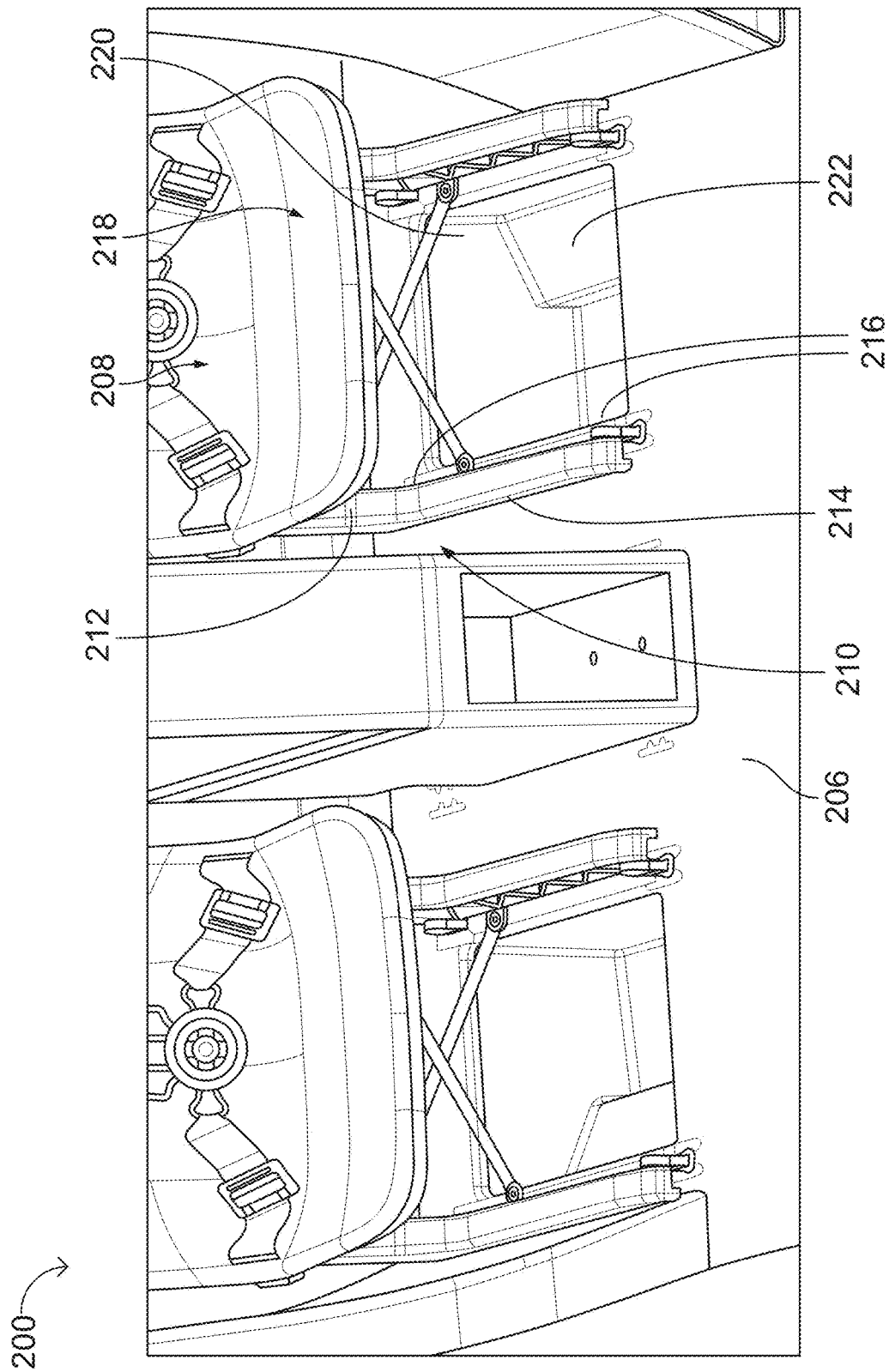
FIG. 2B depicts an additional view of the under seat baggage stowage compartment in the interior of the vehicle of FIG. 2A, according to an exemplary embodiment of the present invention.
Figure 2C:
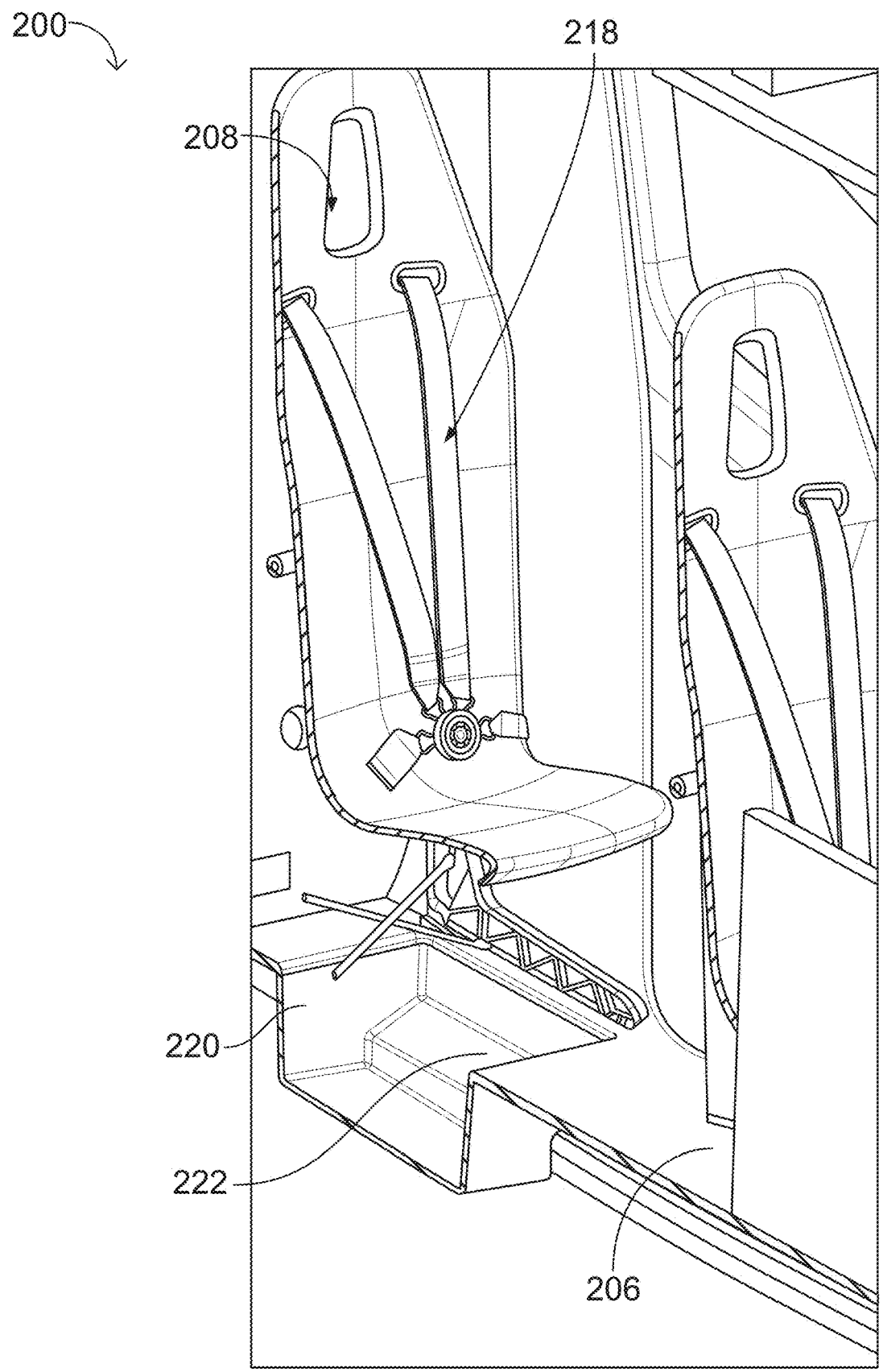
FIG. 2C is a section view of the under seat baggage stowage compartment in the interior of the vehicle of FIG. 2A, according to an exemplary embodiment of the present invention.

FIG. 2B depicts an additional view of the under seat baggage stowage compartment in the vehicle interior 200 of FIG. 2A, while FIG. 2C shows a section view of the under seat baggage stowage compartment in the vehicle interior 200 of FIG. 2A, according to an exemplary embodiment of the present invention. In some embodiments, as shown in FIGS. 2B-2C, the at least one storage compartment 220 includes an at least one protrusion 222. The opposite side of the protrusion 222 on the outside of the storage compartment 220 is configured to encapsulate a portion of a rail of the plurality of rails 204. Further, the protrusion 222 may be of any size, shape, or dimension to properly fit around the portion of the rail of the plurality of rails 204.

Figure 2D:
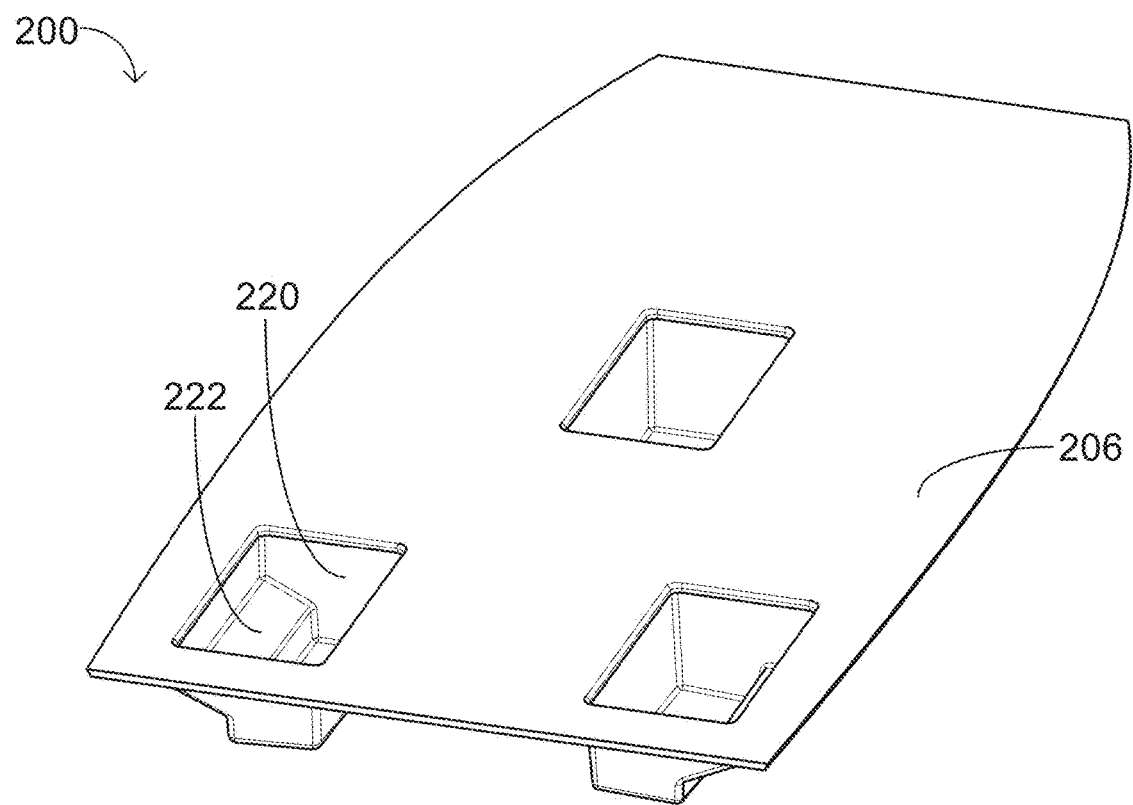
FIG. 2D is an isolated view of a plurality of under seat baggage stowage compartments in a cabin floor of the interior of the vehicle of FIG. 2A, according to an exemplary embodiment of the present invention.
Figure 2E:
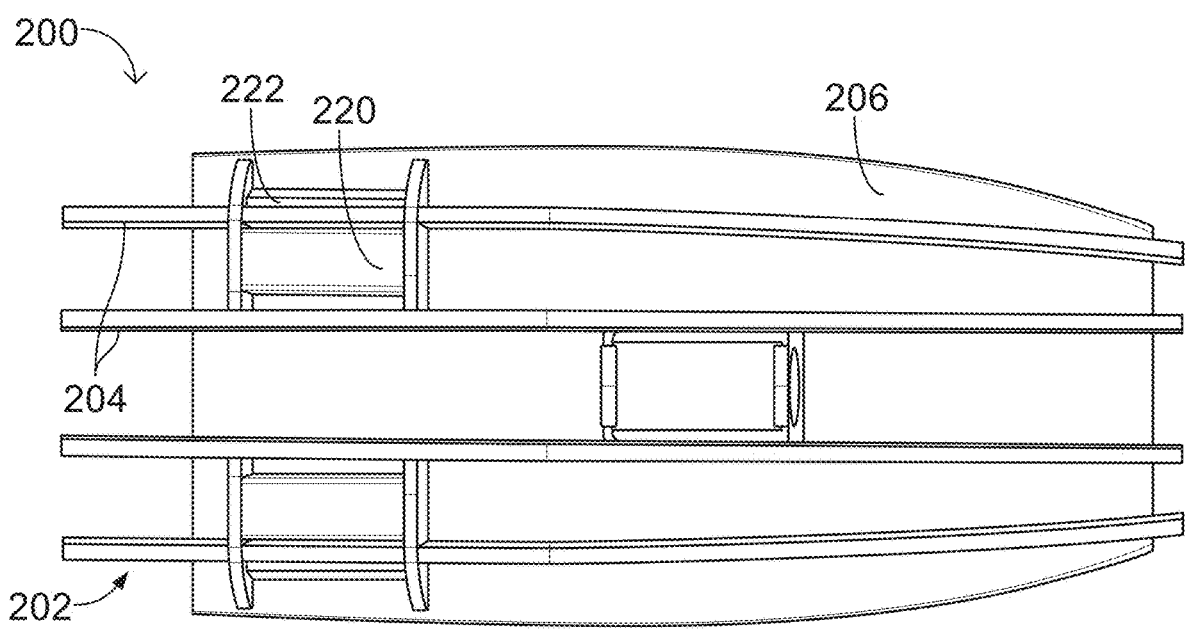
FIG. 2E is an underside view of the under seat baggage stowage compartment and a base frame of the interior of the vehicle of FIG. 2A, according to an exemplary embodiment of the present invention.

FIGS. 2D-2E show aspects of the vehicle interior 200 described in FIG. 2A, namely the floor 206, the at least one storage compartment 220, and the plurality of rails 204. FIG. 2D is an isolated view of the under seat baggage stowage compartment in the floor 206 of the vehicle interior 200 and FIG. 2E is an underside view of the under seat baggage stowage compartment and the plurality of rails 204 of the vehicle interior 200. It should be understood that in other embodiments, any number of storage compartments and rails may be positioned on, under, or within the floor 206. Other structural arrangements of the vehicle interior 200 are also possible.

For instance, in some embodiments, one or more storage compartments may be included on, under, or within the floor 206 in an area adjacent to and/or in an unoccupied location near a pilot's seat. As such, in occupying these spaces, inclusion of an individual cargo bay may be minimized or completely eliminated for passenger crafts.

Figure 3A:
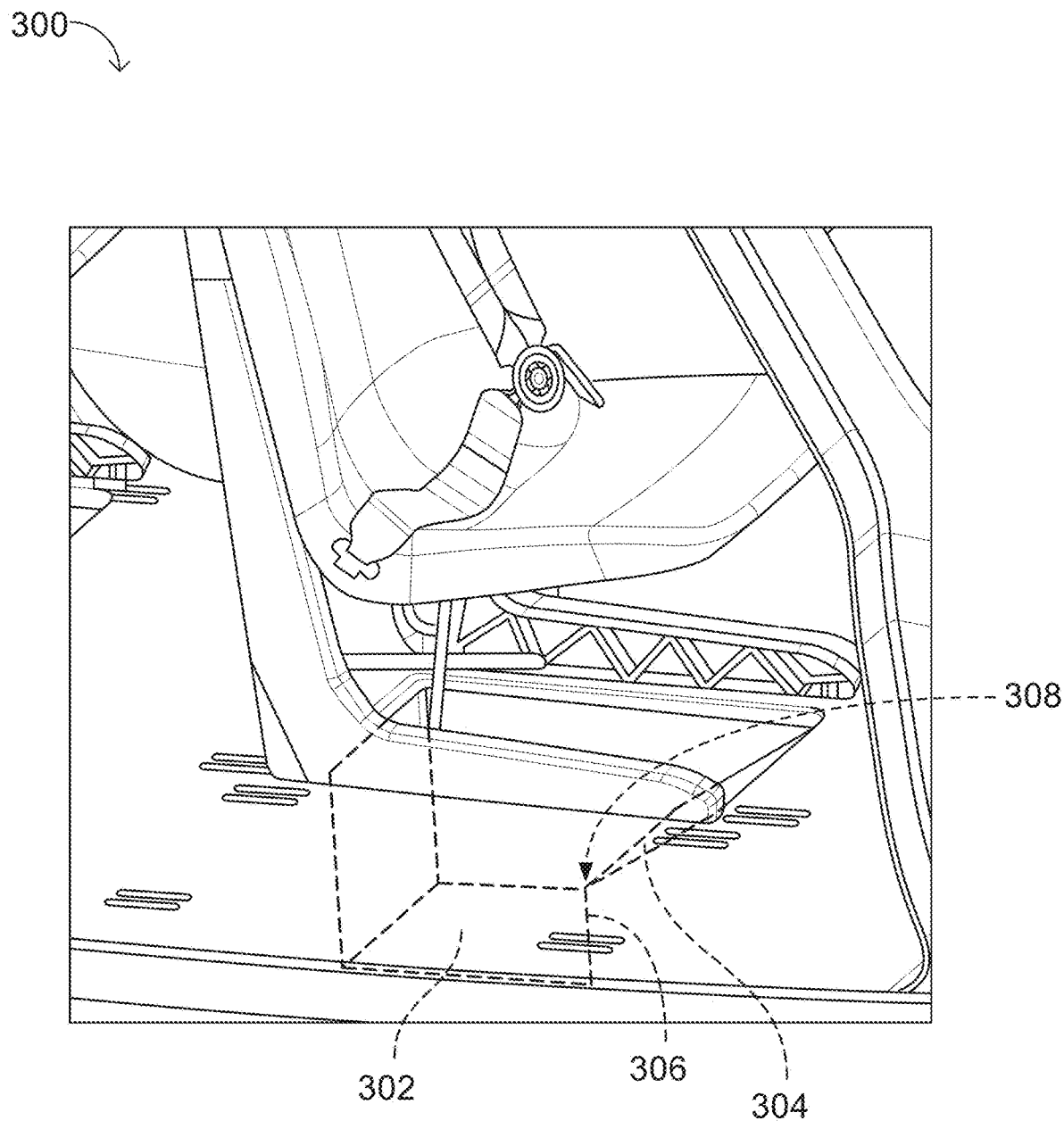
FIG. 3A depicts an alternate embodiment of an under seat baggage stowage compartment having a tapered portion in the interior of a vehicle, according to an exemplary embodiment of the present invention.
Figure 3B:
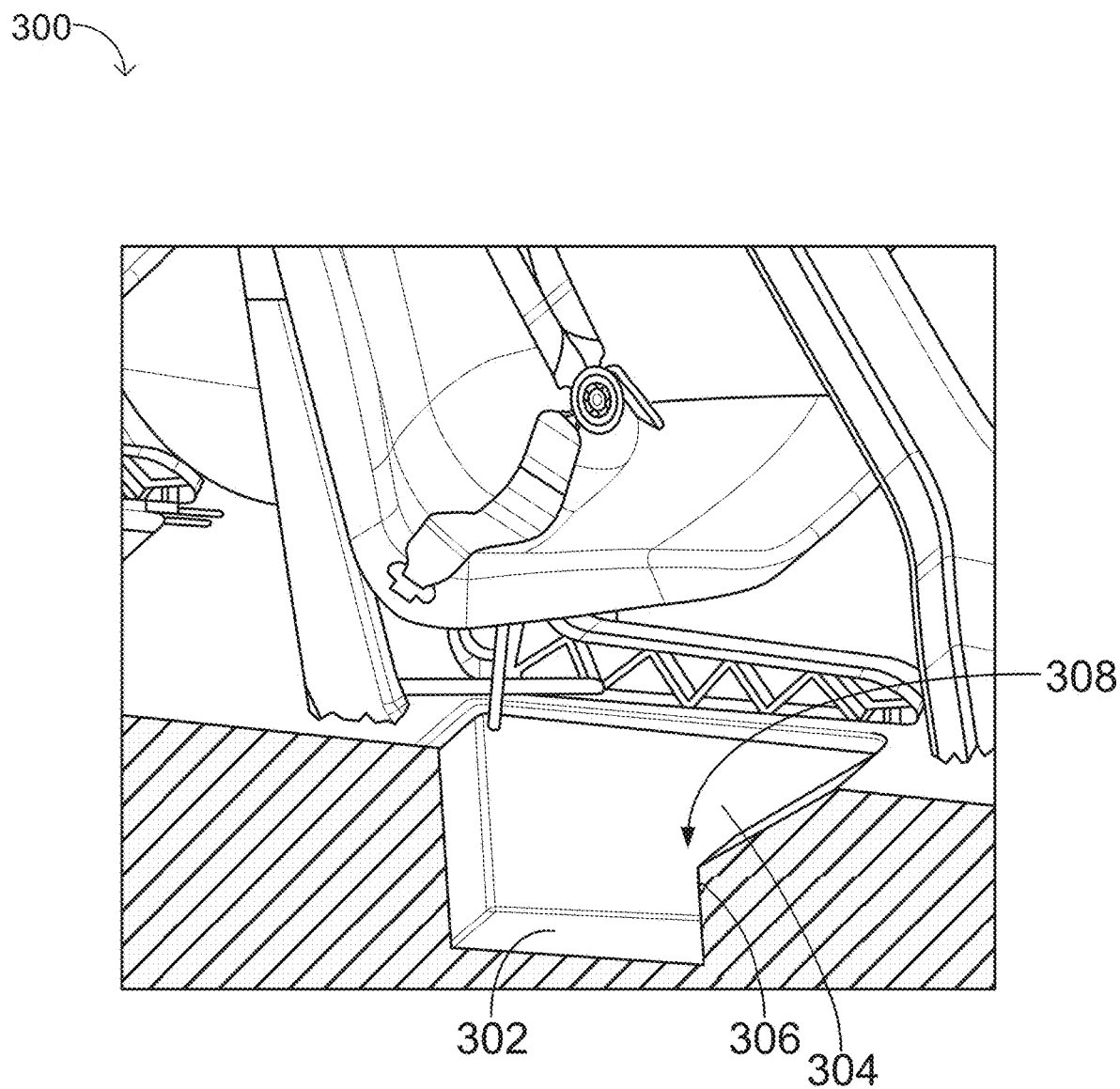
FIG. 3B is a section view of the under seat baggage stowage compartment of FIG. 3A, according to an exemplary embodiment of the present invention.

FIGS. 3A-3B show another embodiment of under seat baggage stowage compartment that includes a storage compartment 300. The storage compartment 300 may have any component of the storage compartment 220 described above with respect to FIGS. 2A-2E. Storage compartment 300 includes a bottom portion 302 and a front portion 304, with the bottom portion 302 extending to a first depth beneath a cabin floor of a vehicle. In some embodiments, the first depth of the bottom portion 302 is constant along an entire length of the bottom portion 302. Between the bottom portion 302 and the front portion 304 is a vertical lip 306. In some embodiments, the vertical lip 306 extends substantially vertically upward from the first depth of the bottom portion 302 of the storage compartment 300 to a second depth beneath the cabin floor of the vehicle, where the second depth is shallower than the first depth. The front portion 304 extends from the second depth at a top 308 of the vertical lip 306 up to the cabin floor of the vehicle such that the front portion 304 tapers along its length between the top 308 of the vertical lip 306 and the cabin floor. A sample cross-section of the storage compartment 300 can be seen in FIG. 3B.

In some embodiments, the bottom portion 302 is configured to have a relatively deep depth such that a larger personal item is able to be stowed without interfering with a vehicle seat or its necessary safety features. As such, some vehicle seats require a certain clearance distance beneath them to function properly during an emergency. By creating a storage compartment 300 that has a relatively deep depth over a portion of the length, larger personal items are able to be safely stowed. In some examples, the depth of the storage compartment can be between about 8 inches and 16 inches.

Further, in some embodiments, the vertical lip 306 acts as a barrier for the stored personal item such that the personal item is prevented from becoming loose in the cabin of a vehicle unwantedly or undesirably. For instance, if the vehicle were to jerk forward or undergo any similar motion, the personal item would be stopped by the vertical lip 306 from becoming free and sliding forward, out of the storage compartment 300.

However, in some instances, placing the personal item into and out of the bottom portion 302 of the storage compartment 300 beneath a vehicle seat might be challenging. So, in order to aid in the ingress/egress of the personal item, by creating a tapered bottom in the front portion 304 of the storage compartment 300, a user may easily slide the personal item up/down the taper to place their personal item in or pull their personal item out from the storage compartment 300.

Figure 4A:
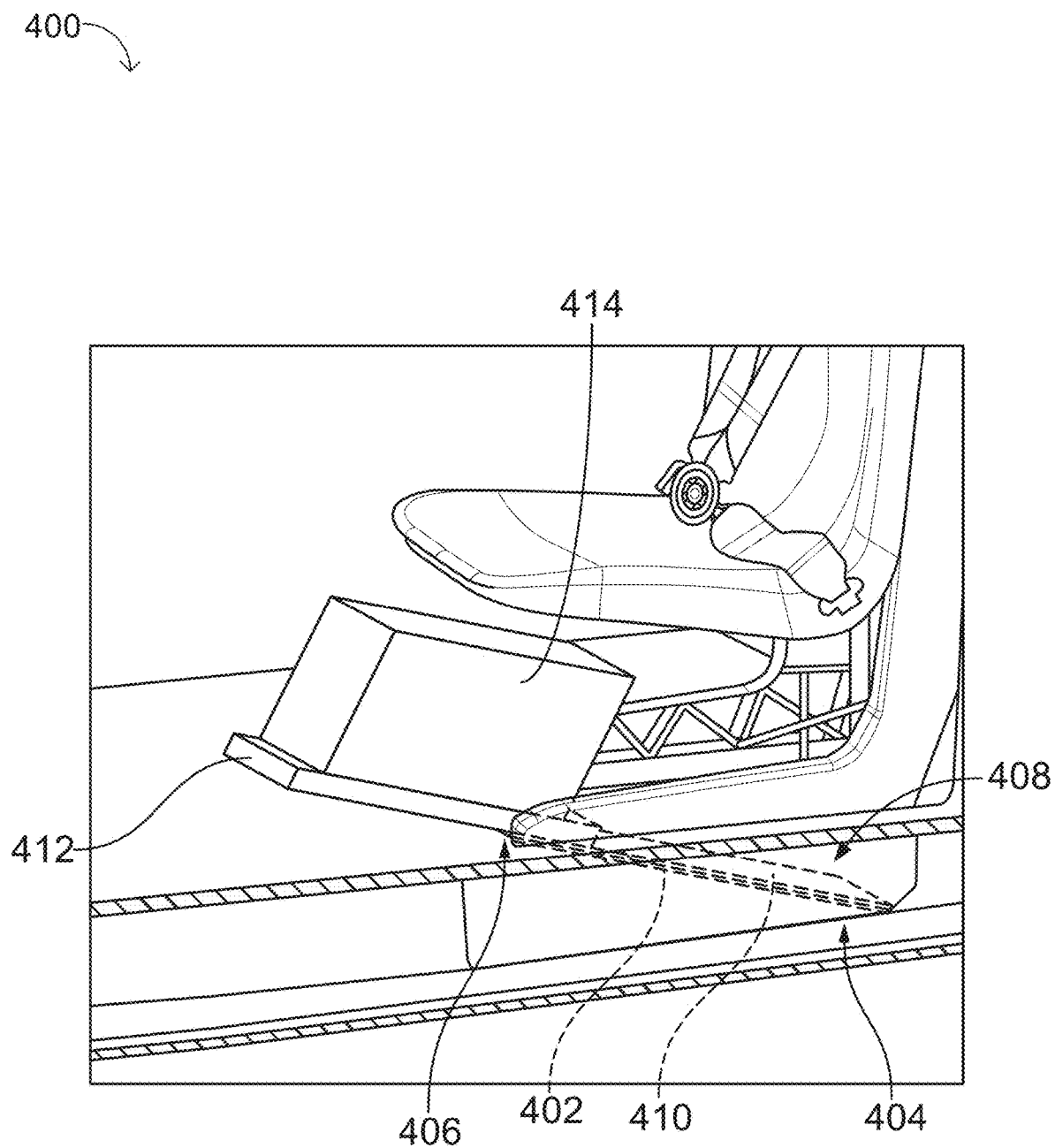
FIG. 4A depicts an under seat baggage stowage compartment having a slidable stowage container in an extended position in the interior of a vehicle, according to an exemplary embodiment of the present invention.
Figure 4B:
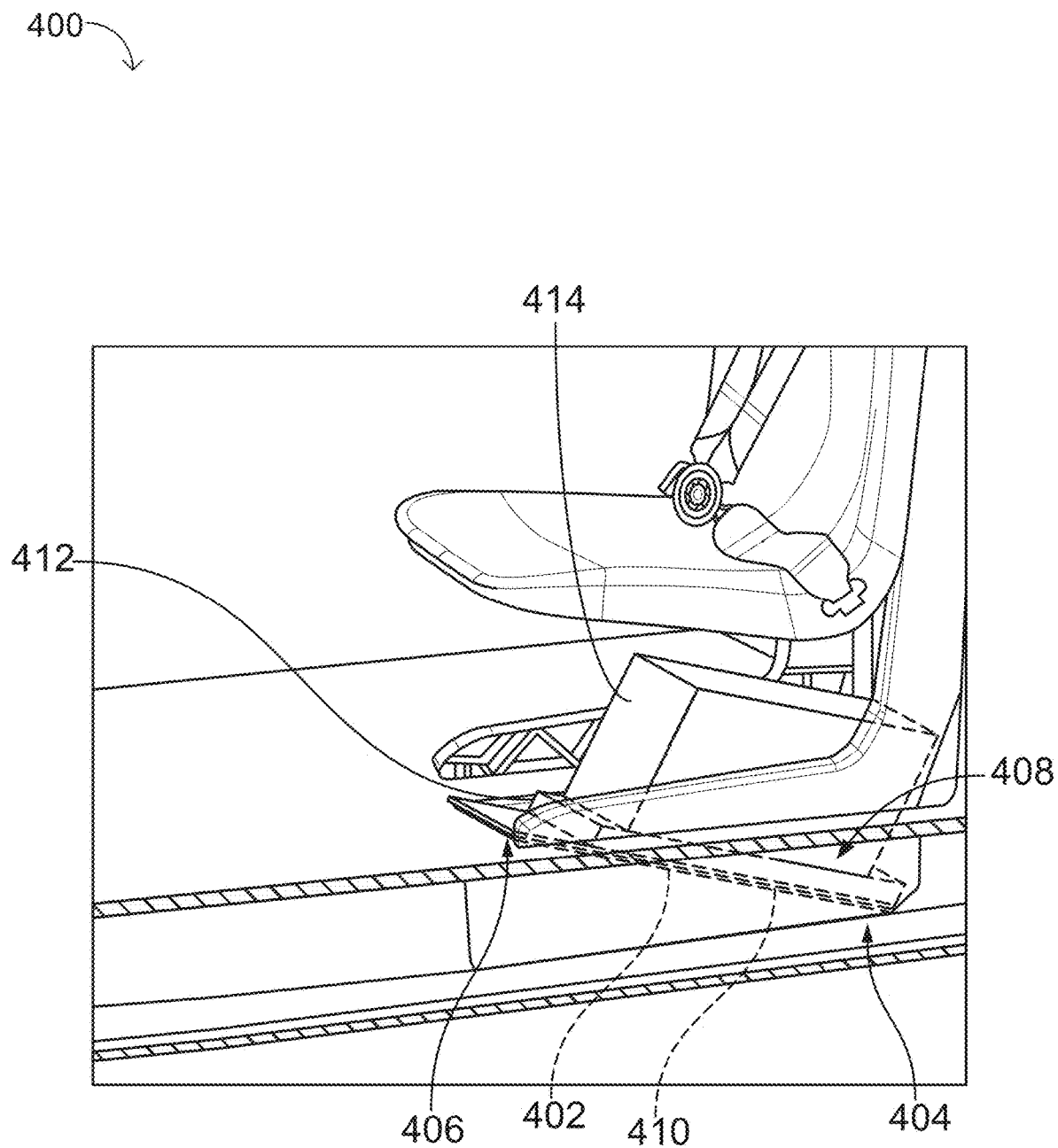
FIG. 4B depicts the under seat baggage stowage compartment having the slidable stowage container in a retracted position of FIG. 4A, according to an exemplary embodiment of the present invention.

FIGS. 4A-4B show another embodiment of under seat baggage stowage compartment that includes a storage compartment 400. The storage compartment 400 may have any component of the storage compartment 220 described above with respect to FIGS. 2A-2E. Storage compartment 400 includes a ramped bottom 402 that tapers from a deepest point 404 of the storage compartment 400 towards a rear of a vehicle seat 208 to a shallowest point 406 of the storage compartment 400 towards a front of the vehicle seat.

In some embodiments, the storage compartment 400 includes a sliding rail 408 having a first component 410 and a second component 412. The first component 410 may be coupled with the ramped bottom 402 of the storage compartment 400 and the second component 412 may be slidably mounted to the first component 410 such that the second component 412 can extend or retract with regard to the first component 410. Further, in some embodiments, a storage box 414 is mounted to the second component 412. The storage box 414 is configured to be received in the storage compartment 400 beneath the vehicle seat when the second component 412 is in a retracted position with regard to the first component 410, and the storage box 414 is configured to at least partially extend beyond a front of the vehicle seat when the second component 412 is in an extended position with regard to the first component 410. In some embodiments, the storage box 414 is designed to hold the personal item of a user. By doing so, in order to aid in the ingress/egress of the user's personal item, the storage box 414 being slidably mounted on to the sliding rail 408 allows for the user to extend the storage box 414 to its extended position in order to deposit or retrieve their personal item, and retract the storage box 414 into its retracted position for the duration of the vehicle's movement.

In some embodiments, the storage box 414 is flush with the floor of the vehicle when the storage box 414 is in its retracted position such that the floor of the vehicle and a top of the storage box 414 create a continuous surface. In other embodiments, a top of the storage box 414 is below the floor of the vehicle when the storage box 414 is in its retracted position. In still other embodiments, a top of the storage box 414 is above the floor of the vehicle when the storage box 414 is in its retracted position. Further, in other embodiments, such as is shown in FIG. 4B, a top of the storage box 414 is partially above and partially below the floor of the vehicle when the storage box 414 is in its retracted position.

Further, in some embodiments, the storage box 414 is flexible. In such embodiments, the storage box 414 comprises a flexible material and/or a netted structure that substantially expands and conforms to the shape of the item being stowed within the storage box 414. In other embodiments, the storage box 414 is rigid.

Figure 5A:
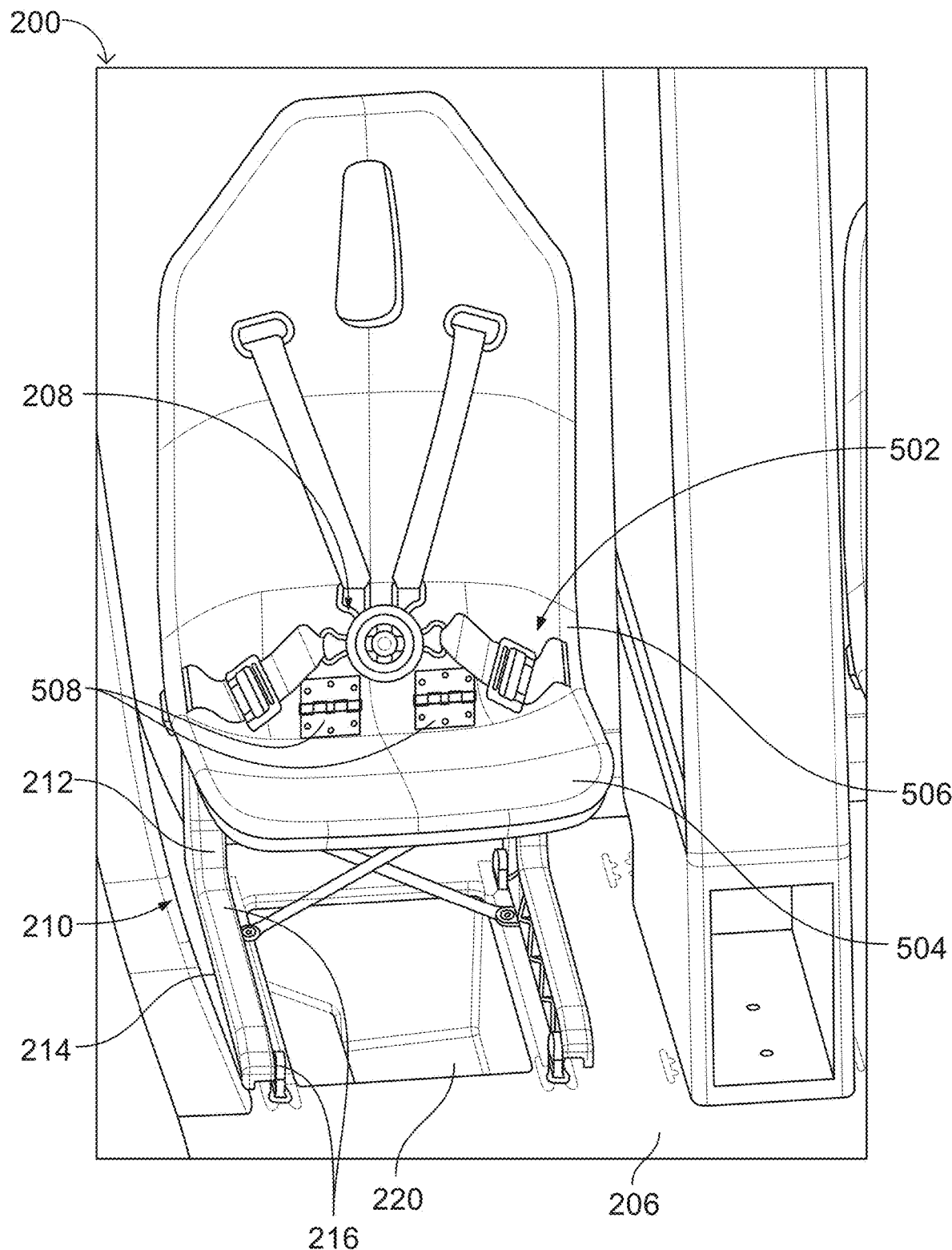
FIG. 5A depicts an under seat baggage stowage compartment in the interior of a vehicle having a hinged seat, according to an exemplary embodiment of the present invention.
Figure 5B:
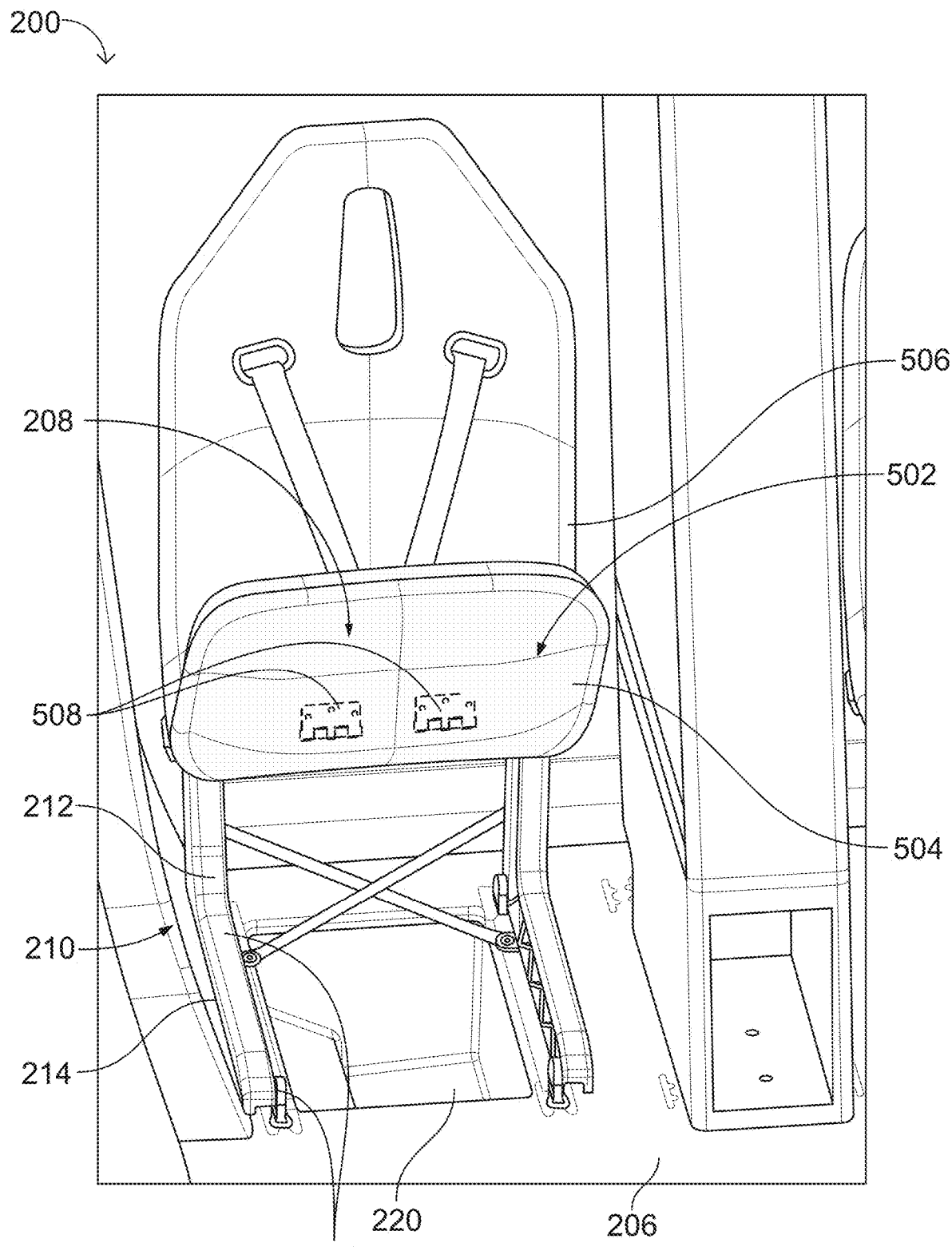
FIG. 5B depicts the under seat baggage stowage compartment in the interior of the vehicle of FIG. 5A having the hinged seat in a collapsed position, according to an exemplary embodiment of the present invention.

FIGS. 5A-5B depict another embodiment of a seat 208 in a vehicle interior 200. In some embodiments, a chair 502 is coupled with a frame 210 of the at least one seat 208. Further, in some embodiments, the chair 502 is a bucket-shaped structure configured to seat a passenger. In some embodiments, as is shown in FIG. 5A, a hinge mechanism 508 is positioned between a bottom piece 504 of the bucket-shaped portion of the chair 502 and a back piece 506 of the bucket-shaped portion of the chair 502. As such, the bottom piece 504 of the bucket-shaped portion of the chair 502 is configured to hinge around the hinge mechanism 508 upwards towards the back piece 506 of the bucket-shaped portion of the chair 502, as is shown in FIG. 5B. By hinging the bottom piece 504 of the bucket-shaped portion of the chair 502 upwards towards the back piece 506 of the bucket-shaped portion of the chair 502, a user is able to more easily access the at least one storage compartment 220 beneath the at least one seat 208 in order to deposit or retrieve a tangible personal item into/from the storage compartment 220 without the bottom piece 504 of the bucket-shaped portion of the chair 502 being in the way.

In any of the above embodiments, additional components, designs, and combinations may be used. For example, above any of the storage compartments in FIGS. 2A-5B may be an upper lid component. In some embodiments, the upper lid component may extend from the floor of the cabin just aft of the storage compartment to a height a set distance above the floor of the cabin and extend outward over at least a portion of the storage component. The height of the upper lid may be determined by a clearance distance required underneath a bottom portion of a seat for clearance purposes. In some embodiments, the upper lid may be sloped at the same rate as the bottom portion of the seat it is under. The upper lid is rigidly affixed above the storage compartment in order to create an upper boundary under which the personal item of the user must fit.

In other embodiments, there may be additional storage compartments within the floor of the cabin of the vehicle besides those described in FIGS. 2A-5B. For instance, a second storage compartment may be within the floor of the cabin in front of an at least one seat covered by a top/hatch such that the top/hatch is flush with the floor of the cabin when in the closed position. Therefore, a passenger's feet may be set top of the top/hatch of the second storage compartment when seated in the at least one seat in the vehicle. In other embodiments, supplemental flange storage spaces may be built off of the storage compartments shown in FIGS. 2A-5B. For instance, the flange may be an aperture extending beneath a portion of the first frame of the first seat such that the flange has the third depth beneath the cabin floor at a location above a rail of the plurality of rails of the exterior base frame between a first attachment point and a second attachment point. By adding this additional flange in unused space, extra storage for personal items of a user is created.

Further, in any of the embodiments described above, the substantially vertical component of the frame of the seat may include a stroking channel configured to receive a stroking mechanism on the backside of the back piece of the bucket-shaped portion of the seat such that the stroking mechanism is received within the stroking channel. Therefore, during a hard landing or a crash, the stroking mechanism is able to stroke the entire seat downward along a length of the stroking channel until a maximum stroke distance has been achieved to help absorb impact. In some embodiments, the stroking channel further includes a stroking stopper at a bottom portion of the stroking channel such that the stroking stopper prevents a bottom piece of the stroking mechanism in the backside of the bucket-shaped portion of the seat from stroking below a maximum stroke distance during this absorption.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

What is claimed is:

1. A vehicle interior comprising:
    a base frame comprising a plurality of rails;
    a floor mounted on the base frame;
    at least one seat comprising:
        a frame having a substantially vertical component and a substantially horizontal component, wherein the substantially horizontal component is mounted to the floor, and wherein the substantially vertical component extends upwards from one end of the substantially horizontal component; and
        a chair coupled to the frame; and
    at least one storage compartment positioned within the floor under the at least one seat, the at least one storage compartment being positioned between two of the plurality of rails.

2. The vehicle interior of claim 1, wherein the at least one storage compartment comprises a protrusion, and wherein a side of the protrusion is configured to encapsulate a portion of a rail of the plurality of rails.

3. The vehicle interior of claim 1, wherein the at least one storage compartment comprises:
    a bottom portion, wherein the bottom portion extends to a first depth beneath the floor of the vehicle interior;
    a front portion; and
    a vertical lip, wherein the vertical lip extends between the bottom portion and the front portion.

4. The vehicle interior of claim 3, wherein the vertical lip extends substantially vertically upward from the first depth of the bottom portion to a second depth beneath the floor of the vehicle interior, wherein the second depth is shallower than the first depth, and wherein the front portion extends from the second depth at a top of the vertical lip up to the floor of the vehicle interior such that the front portion tapers along its length between the top of the vertical lip and the floor of the vehicle interior.

5. The vehicle interior of claim 1, wherein the at least one storage compartment comprises a ramped bottom that tapers from a deepest point of the at least one storage compartment towards a rear of the at least one seat, to a shallowest point of the at least one storage compartment towards a front of the at least one seat.

6. The vehicle interior of claim 5, further comprising:
a sliding rail, wherein the sliding rail comprises a first component coupled to the ramped bottom of the at least one storage compartment, and wherein the sliding rail comprises a second component slidably mounted to the first component such that the second component is able to extend and retract with regard to the first component.

7. The vehicle interior of claim 6, further comprising:
a storage box mounted to the second component of the sliding rail, wherein the storage box is configured to be received in the at least one storage compartment beneath the at least one seat when the second component is in a retracted position with regard to the first component, and wherein the storage box is configured to at least partially extend beyond a front of the at least one seat when the second component is in an extended position with regard to the first component.

8. The vehicle interior of claim 1, further comprising:
an at least second storage compartment, wherein the at least second storage compartment is positioned within the floor of the vehicle interior.

9. The vehicle interior of claim 1, wherein the plurality of rails each extend lengthwise across the base frame.

10. The vehicle interior of claim 1, wherein the horizontal component of the frame is mounted to the floor by a first attachment point near a front end of the substantially horizontal component of the frame and a second attachment point near an aft end of the substantially horizontal component of the frame.

11. The vehicle interior of claim 1, wherein the substantially vertical component of the frame and the substantially horizontal component of the frame are manufactured integrally with each other.

12. The vehicle interior of claim 1, wherein the chair comprises a back piece and a bottom piece.

13. The vehicle interior of claim 12, wherein the chair further comprises a hinge mechanism, and wherein the bottom piece of the chair is configured to hinge around the hinge mechanism upwards towards the back piece of the chair.

14. A craft comprising:
a body including a vehicle interior, the vehicle interior comprising:
a base frame comprising a plurality of rails;
a floor mounted on the base frame;
at least one seat comprising:
a frame having a substantially vertical component and a substantially horizontal component, wherein the substantially horizontal component is mounted to the floor, and wherein the substantially vertical component extends upwards from one end of the substantially horizontal component; and
a chair coupled to the frame; and
at least one storage compartment positioned within the floor under the at least one seat, the at least one storage compartment being positioned between two of the plurality of rails;
at least one wing extending from the body of the craft;
a plurality of rotors; and
a tail.

15. The craft of claim 14, wherein the at least one storage compartment is configured as a recess having a front portion and a bottom portion, and wherein the bottom portion extends to a first depth beneath the floor, the front portion has a depth that tapers across a length of the front portion, and a vertical lip extends between the bottom portion and the front portion such that the front portion tapers from a top of the vertical lip to the floor.

16. The craft of claim 14, wherein the at least one storage compartment is configured as a recess which tapers from a deepest point towards a rear of the at least one seat to a shallowest point towards a front of the at least one seat, and wherein the recess further comprises:
a sliding rail having a first component and a second component, wherein the first component is coupled with a bottom of the recess, and wherein the second component is slidably mounted to the first component such that the second component can extend or retract with regard to the first component.

17. The craft of claim 16, wherein the recess further comprises a storage box mounted to the second component, wherein the storage box is configured to be received in the recess beneath the at least one seat when the second component is in a retracted position with regard to the first component, and wherein the storage box is configured to at least partially extend beyond the front of the first seat when the second component is in an extended position with regard to the first component.

* * * * *